United States Patent [19]

Leiber

[11] Patent Number: 4,700,797
[45] Date of Patent: Oct. 20, 1987

[54] PROPULSION CONTROL SYSTEM FOR MOTOR VEHICLES

[75] Inventor: Heinz Leiber, Oberriexingen, Fed. Rep. of Germany

[73] Assignee: Daimler-Benz AG, Stuttgart, Fed. Rep. of Germany

[21] Appl. No.: 943,485

[22] Filed: Dec. 19, 1986

[30] Foreign Application Priority Data

Dec. 21, 1985 [DE] Fed. Rep. of Germany ....... 3545545

[51] Int. Cl.$^4$ .............................................. B60K 17/34
[52] U.S. Cl. ..................................... 180/197; 180/249
[58] Field of Search ............... 180/197, 244, 247, 248, 180/249

[56] References Cited

U.S. PATENT DOCUMENTS

| 3,802,529 | 4/1974 | Burckhardt et al. | 180/197 |
| 4,484,653 | 11/1984 | Horikoshi | 180/197 |
| 4,552,241 | 11/1985 | Suzuki | 180/249 |
| 4,558,414 | 12/1985 | Sakakiyawa | 180/197 |

Primary Examiner—David M. Mitchell
Assistant Examiner—Doan McGiehan
Attorney, Agent, or Firm—Barnes & Thornburg

[57] ABSTRACT

A motor vehicle having a multi-axle drive that can be connected via an engageable transfer transmission and wheel couplings, and having a differential lock for the wheels of the permanently driven axle, in which case the lock and the couplings can be automatically connected or disconnected as a function of comparative conditions obtained from the speeds of the wheels and of the transfer transmission output shaft as well as the steering angle.

6 Claims, 1 Drawing Figure

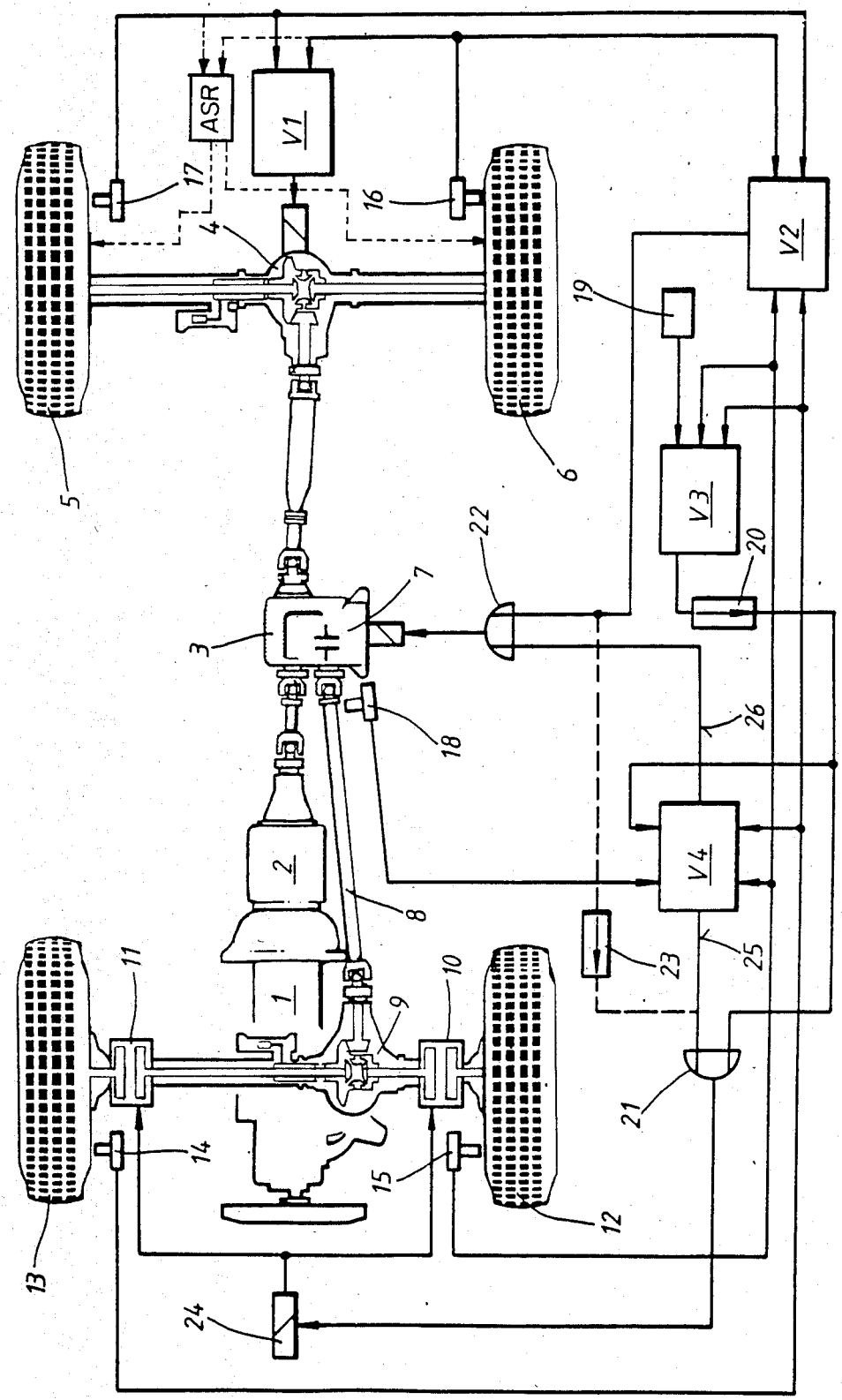

PROPULSION CONTROL SYSTEM FOR MOTOR VEHICLES

BACKGROUND AND SUMMARY OF THE INVENTION

The invention relates to a motor vehicle having multi-axle drive and controls thereof.

Such drive concepts are known in various cross-country vehicles that use so-called free-wheel hubs as the wheel couplings and where the transfer transmission and the differential lock can be shifted electrically or electropneumatically or electrohydraulically by hand. The structural elements that are intended for the connectable drive are designed for high running outputs since, at least theoretically, there is the possibility that this drive is connected permanently.

It is the objective of the invention to improve the known drive of the above-mentioned type in such a way that the driver is relieved from the decision concerning the connecting or disconnecting of locks and couplings and that nevertheless no or no significant additional costs will occur.

According to the invention, this objective is achieved by a system that automatically shifts the differential and transfer transmission lock and wheel couplings. By means of the automatic shifting of the lock and of the couplings, it is ensured that the drive that can be connected is connected only when it is really required. It may therefore be designed for lower running outputs and, as a result, is less costly to manufacture. This absorbs, at least partially, the additional costs that can be reduced further by the predominant operation in the single axle drive and the resulting savings of fuel costs.

The system includes a first comparator or an a slip control system for receiving the output signal of the speed sensors for the permanently driven wheels and emitting an output control signal when the speed exceeds a given value to control the to lock the differential or to provide braking respectfully. A second comparator forms a median speed signal from the output sensors of all the wheels, determines a threshold value from the median speed, compares the individual wheel speeds with the assigned threshhold value and emits an output when the speed sensor outputs exceed the assigned threshhold value. A third comparator forms a quantity characteristic of the driving condition of the motor vehicle from the speed sensors for the connectable driven wheels and a steering angle sensor and emits an output when this quanity exceeds a fixed value assigned to the steering angle or the driving speed. A fourth comparator provides a first output signal when the output signal of the speed comparator of the output shaft from the transfer transmission to the connectable wheels is within the tolerance range of the output signal of the speed sensor of the most slowly turning connectible wheel and a second output when the output of the third comparator and the first output of the fourth comparator exists simultaneously. A first OR-gate has an imput from the second comparator and the second output of the fourth comparator for providing a control signal to the coupling of the transfer transmission. A second OR-gate receives an input from the third comparator and the first output of the fourth comparator and provides an output signal to control the wheel couplings of the connectable driven wheels. A monostable circuit may be provided to the output of the third comparator to prolong the output signal for an indicated period of time. The first output of the fourth comparative may be replaced by the output signal from the second comparator that is delayed by a time delay circuit.

Other objects, advantages and novel features of the present invention will become apparent from the following detailed description of the invention when considered in conjunction with the accompanying drawings.

BRIEF DESCRIPTION OF THE DRAWINGS

FIG. 1 is a block diagram of a motor vehicle having a multi-axis drive according to the principles of the present invention.

DETAILED DESCRIPTION OF THE DRAWING

The drawing, in diagram form, shows the drive of a motor vehicle with two axles. The drive includes an engine 1 connected, via a transmission 2, a transfer transmission 3, and a rear axle differential 4 equipped with a lock, to the permanently driven rear wheels 5 and 6. The transfer transmission 3, can be connected via electrohydraulically shiftable coupling 7, an output shaft 8, a front axle differential 9, and electrofluidically (pnumatic or hydraulic) shiftable couplings 10 and 11, to the front wheels 12 and 13. All the wheels 5, 6, 12, 13 and the output shaft 8 are equipped with rotational speed sensors 14 to 18.

The output signals of the rotational speed sensors 16, 17 assigned to the rear wheels 5, 6 are fed to a first comparator V1. The comparator V1 emits an output signal for the locking of the rear axle differential 4 when the difference of the rear wheel speeds exceeds an indicated limit value. This first comparator IV and the differential lock may be replaced by a wheel slip control that is known for example DE OS No. 353 4443 per se and affects the brakes of the rear wheels, which, is shown in the dashed lines or ASR.

The output signals of all four wheel speed sensors 14 to 17 are fed to a second comparator V2. The comparator V2 forms a median speed signal from the wheel speed signals, and threshold value from the median speed signal. The individual output signals of the speed sensors are compared with the threshold values. When one of these signals exceeds the assigned threshold value, the second comparator V2 emits an output signal, the further processing of which will be explained later.

The output signals of the front wheel speed sensors 14 and 15 as well as the output signal of a steering angle sensor 19 are fed to a third comparator V3. The comparator V3 by itself is shown in DE-OS No. 35 05 455. It evaluates the speed difference of the front wheels and compares it with limit values assigned to the driving speed that is also derived from the front wheel speeds and the steering angle. When the limit values are exceeded, an output signal is emitted. This criterion responds irrespective of the rear axle lock or of the slip criterion of the wheel-slip-controlled rear wheels when, for example, a front wheel spins or when the vehicle, without longitudinal acceleration, drives into an increasingly narrow turn and also measures, for example, countersteering motions in turns that are driven fast.

The output of the third comparator V3 is connected to a monostable circuit 20 that prolongs the output signal of the comparator V3 for an indicated period of time, such as 2 seconds. Its further processing will be explained later.

In addition, a fourth comparator V4 is provided to which the output signals of the front wheel speed sensors 14 and 15, of the speed sensor 18 of the output shaft 8 and the output signal of the monostable circuit 20 are fed.

The fourth comparator V4, at its first output 25, emits a first output signal when the speed of the output shaft 8 is within an indicated tolerance range of speed of the slower turning front wheel 12 or 13.

At its second output 26, the comparator V4 emits a second output signal when the output signal of the monostable circuit 20 and the first output signal at the output 25 are present at the same time.

The output of the second comparator V2 and the second output 26 of the comparator V4 are each connected with an input of an OR-gate 22, the output signal of which is the control signal for the coupling 7 of the transfer transmission 3.

The output of the monostable circuit 20 and the first output 25 of the comparator V4 are each connected with an additional OR-gate 21, the output signal of which is the control signal for the electrohydraulic valve 24 for the wheel couplings 10 and 11.

The first output signal at the first output 25 of the fourth comparator V4 may be replaced as an input to OR-gate 21 by the output signal of the second comparator V2, if it is delayed with respect to being turned on. In the drawing, this is shown by a dashed line by means of a time delay element 23 that delays the turn-on.

The method of operation of the described motor vehicle drive is as follows:

Normally, the vehicle drives with rear wheel drive, in which case the transfer transmission 3, its output shaft 8, the front axle differential 9 and the drive shafts of the front wheels stand still, and the front wheels move along freely. If an undesirably large speed difference occurs at the driven rear wheels, the rear axle differential 4 is locked via the comparator V1. If a wheel rotates faster than the threshold value assigned to it that is determined by a median speed, the coupling 7 is closed via the comparator V2 and thus the front axle drive is driven up to the wheel couplings 10, 11. As soon as the comparator V4 determines a state of near-synchronization, the wheel couplings 10, 11 are closed and thus the four-wheel drive is established.

If, on the other hand, because of the steering angle and the front wheel speeds, an undesirable moving condition of the vehicle is determined in the comparator V3, its output signal causes a closing of the wheel couplings, 10, 11 by means of which the front axle drive train is driven by the front wheels 12, 13. If the comparator V4 then determines a synchronization, a control signal, via its second output 26, is emitted for the closing of the transfer transmission coupling 7, which also establishes a four-wheel drive.

The time-delayed connection of the couplings prevents a reactive effect of the drive torque, during the acceleration of the drive train, on the wheels of the front or rear axle, according to the sequence of the connecting operations.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. In a motor vehicle having a permanent drive for the wheels of one axle via a lockable differential gear and having a drive that, for the wheels of at least one other axle that can be connected via wheel couplings with their driving axles that can be driven by an engageable transfer transmission via a differential, the improvement comprising:
   speed sensors means for all drivable wheels and the output shaft of the transfer transmission causing the connectable drive to said other axle; and
   electrofluidic means for shifting the wheel couplings,
   a first comparator means for receiving the output signals of the speed sensors means of the permanently driven wheels, and for emitting an output signal when the difference of the wheel speeds exceeds an indicated value,
   the output signal of the first comparator means being connected as the control signal for the lock of the differential,
   a second comparator means for receiving the output signals of the speed sensors means of all wheels, for forming a median speed signal, for determining threshold values from said median speed, for comparing the individual output signals of the speed sensors means with assigned threshold value, and for emitting an output signal when one of these speed sensor output signals exceeds the assigned threshold value,
   steering angle sensor means
   a third comparator for receiving the output signals of the speed sensors means of the connectably driven wheels and of said steering angle sensor means and for emitting an output signal when a quantity formed from these signals characterizing the condition of movement of the motor vehicle exceeds a limit value that is assigned to the steering angle and the driving speed,
   a fourth comparator means for receiving the output signals of the speed sensors means of the connectibly driven wheels, of the speed sensor means of the output shaft of the transfer transmission and of the third comparator means, for emitting, at a first output, a first output signal when the output signal of the speed sensor means of the output shaft is within a tolerance range of the output signal of the speed sensor means of the more slowly turning connectably driven wheels, and for emitting, at a second output, a second output signal when the output signal of the third comparator means and the first output signal of the fourth comparator means exist simultaneously,
   a first OR-means for receiving inputs from the output of the second comparator means and the second output of the fourth comparator means and for emitting an output signal as the control signal for the coupling of the transfer transmission when either input is present, and
   a second OR-element for receiving inputs from output of the third comparator means and the first output of the fourth comparator means, and emitting an output signal as the control signal for the wheel couplings when any of its inputs is present.

2. A motor vehicle according to claim 1, including a monostable circuit connected to the output of said third comparator means for prolonging the output signal of the third comparator means for an indicated period of time.

3. In a motor vehicle having a permanent drive for the wheels of one axle via a differential gear and having a drive that, for the wheels of at least one other axle that can be connected via wheel couplings with their driving axles that can be driven by an engageable transfer transmission via a differential, the improvement comprising:
- speed sensors means for all drivable wheels and the output shaft of the transfer transmission causing the connectable drive to said other axle; and
- electrofluidic means for shifting the wheel couplings,
- a slip control means for receiving the output signals of the speed sensors means of the permanently driven wheels, and for emitting an output signal to control braking when slip is determined,
- a second comparator means for receiving the output signals of the speed sensors means of all wheels, for forming a median speed signal, for determining threshold values from said median speed, for comparing the individual output signals of the speed sensors means with assigned threshold value, and for emitting an output signal when one of these speed sensor output signals exceeds the assigned threshold value,
- steering angle sensor means
- a third comparator for receiving the output signals of the speed sensors means of the connectably driven wheels and of said steering angle sensor means and for emitting an output signal when a quantity formed from these signals characterizing the condition of movement of the motor vehicle exceeds a limit value that is assigned to the steering angle and the driving speed,
- a fourth comparator means for receiving the output signals of the speed sensors means of the connectably driven wheels, of the speed sensor means of the output shaft of the transfer transmission and of the third comparator means, for emitting at a first output, a first output signal when the output signal of the speed sensor means of the output shaft is within a tolerance range of the output signal of the speed sensor means of the more slowly turning connectably driven wheels, and for emitting at a second output a second output signal when the output signal of the third comparator means and the first output signal of the fourth comparator means exist simultaneously,
- a first OR-means for receiving inputs from the output of the second comparator means and the second output of the fourth comparator means and for emitting an output signal as the control signal for the coupling of the transfer transmission when either input is present, and
- a second OR-element for receiving inputs from output of the third comparator means and the first output of the fourth comparator means, and emitting an output signal as the control signal for the wheel couplings when any of its inputs is present.

4. A motor vehicle according to claim 3, including a monostable circuit connected to the output of said third comparator means for prolonging the output signal of the third comparator means for an indicated period of time.

5. In a motor vehicle having a permanent drive for the wheels of one axle via a lockable differential gear and having a drive that, for the wheels of at least one other axle that can be connected via wheel couplings with their driving axles that can be driven by an engageable transfer transmission via a differential, the improvement comprising:
- speed sensors means for all drivable wheels and the output shaft of the transfer transmission causing the connectable drive to said other axle; and
- electrofluidic means for shifting the wheel couplings,
- a first comparator means for receiving the output signals of the speed sensors means of the permanently driven wheels, and for emitting an output signal when the difference of the wheel speeds exceeds an indicated value,
- the output signal of the first comparator means being connected as the control signal for the lock of the differential,
- a second comparator means for receiving the output signals of the speed sensors means of all wheels, for forming a median speed signal, for determining threshold values from said median speed, for comparing the individual output signals of the speed sensors means with assigned threshold value, and for emitting an output signal when one of these speed sensor output signals exceeds the assigned threshold value,
- time delay means for receiving the output signal of said second comparator means and for providing a delayed output signal of said second comparator means,
- steering angle sensor means
- a third comparator for receiving the output signals of the speed sensors means of the connectably driven wheels and of said steering angle sensor means and for emitting an output signal when a quantity formed from these signals characterizing the condition of movement of the motor vehicle exceeds a limit value that is assigned to the steering angle and the driving speed,
- a fourth comparator means for receiving the output signals of the speed sensors means of the connectably driven wheels, of the speed sensor means of the output shaft of the transfer transmission and of the third comparator means, for emitting, at a first output, a first output signal when the output signal of the speed sensor means of the output shaft is within a tolerance range of the output signal of the speed sensor means of the more slowly turning connectably driven wheels, and for emitting at a second output a second output signal when the output signal of the third comparator means and the first output signal of the fourth comparator means exist simultaneously,
- a first OR-means for receiving inputs from the output of the second comparator means and the second output of the fourth comparator means and for emitting an output signal as the control signal for the coupling of the transfer transmission when a either input is present, and
- a second OR-element for receiving inputs from output of the third comparator means and the delayed output of the time delay means, and emitting an output signal which is the control signal for the wheel couplings when any of its inputs is present.

6. A motor vehicle according to claim 5, including a monostable circuit connected to the output of said third comparator means for prolonging the output signal of the third comparator means for an indicated period of time.

* * * * *